(12) United States Patent
Royyuru

(10) Patent No.: US 9,846,866 B2
(45) Date of Patent: Dec. 19, 2017

(54) PROCESSING OF FINANCIAL TRANSACTIONS USING DEBIT NETWORKS

(75) Inventor: Vijay Royyuru, Norristown, PA (US)

(73) Assignee: First Data Corporation, Greenwood Village, CO (US)

( * ) Notice: Subject to any disclaimer, the term of this patent is extended or adjusted under 35 U.S.C. 154(b) by 1985 days.

(21) Appl. No.: 11/677,960

(22) Filed: Feb. 22, 2007

(65) Prior Publication Data

US 2008/0208759 A1    Aug. 28, 2008

(51) Int. Cl.
| | |
|---|---|
| *G06Q 20/20* | (2012.01) |
| *G06Q 20/38* | (2012.01) |
| *G06Q 20/36* | (2012.01) |
| *G06Q 20/40* | (2012.01) |
| *G06Q 30/06* | (2012.01) |
| G06Q 20/00 | (2012.01) |

(52) U.S. Cl.
CPC ......... *G06Q 20/20* (2013.01); *G06Q 20/3674* (2013.01); *G06Q 20/382* (2013.01); *G06Q 20/4012* (2013.01); *G06Q 30/06* (2013.01); G06Q 20/00 (2013.01)

(58) Field of Classification Search
CPC .. G06Q 20/00; G06Q 20/3674; G06Q 20/382; G06Q 20/20
USPC .............................. 726/30; 705/1, 26, 64–75
See application file for complete search history.

(56) References Cited

U.S. PATENT DOCUMENTS

| | | | | |
|---|---|---|---|---|
| 5,163,098 A | * | 11/1992 | Dahbura ................ | G06Q 20/04 705/75 |
| 5,577,121 A | * | 11/1996 | Davis ................... | G06Q 20/341 380/283 |
| 5,590,197 A | * | 12/1996 | Chen ...................... | G06Q 20/04 380/30 |
| 5,850,442 A | * | 12/1998 | Muftic .................. | G06Q 20/02 380/30 |
| 5,917,168 A | * | 6/1999 | Nakamura ......... | G06Q 20/3572 235/379 |
| 6,085,168 A | * | 7/2000 | Mori ...................... | G06Q 20/00 705/17 |
| 6,100,804 A | * | 8/2000 | Brady .............. | G06K 19/07749 257/678 |
| 6,270,011 B1 | * | 8/2001 | Gottfried ................ | G06F 21/32 235/379 |
| 6,393,411 B1 | * | 5/2002 | Bishop ................... | G06Q 20/06 70/39 |

(Continued)

*Primary Examiner* — Mamon Obeid
(74) *Attorney, Agent, or Firm* — Kilpatrick Townsend & Stockton LLP

(57) ABSTRACT

Methods and systems are disclosed for executing financial transactions between customers and merchants. An identifier of a financial account is received from the customer at a merchant system. A one-time password is also received from the customer at the merchant system, with the customer having been provided with the one-time password by a mobile electronic device or contactless presentation instrument. A cryptogram is generated to include the identifier of the financial account encrypted using the one-time password. An authorization request is formulated at the merchant system. The authorization request includes the cryptogram and transaction information describing at least a portion of the financial transaction. The authorization request is transmitted from the merchant system to an authorization processor for authorization of the financial transaction.

22 Claims, 9 Drawing Sheets

(56) References Cited

U.S. PATENT DOCUMENTS

| | | | | |
|---|---|---|---|---|
| 6,442,448 B1* | 8/2002 | Finley | B67D 7/145 | 700/231 |
| 6,598,031 B1* | 7/2003 | Ice | G06Q 20/04 | 705/50 |
| 6,607,136 B1* | 8/2003 | Atsmon | G06F 21/34 | 235/487 |
| 6,636,833 B1* | 10/2003 | Flitcroft | G06Q 20/00 | 235/380 |
| 6,715,078 B1* | 3/2004 | Chasko | G06F 21/34 | 713/182 |
| 7,020,635 B2* | 3/2006 | Hamilton | G06Q 20/00 | 705/51 |
| 7,080,049 B2* | 7/2006 | Truitt | G06Q 20/16 | 380/30 |
| 7,090,128 B2* | 8/2006 | Farley | H04L 67/2823 | 235/384 |
| 7,107,462 B2* | 9/2006 | Fransdonk | G06Q 20/12 | 380/282 |
| 7,213,144 B2* | 5/2007 | Faccin | H04L 63/04 | 380/247 |
| 7,222,239 B2* | 5/2007 | Smith | G07C 9/00111 | 713/185 |
| 7,287,692 B1* | 10/2007 | Patel | G06Q 20/10 | 235/379 |
| 7,412,420 B2* | 8/2008 | Holdsworth | G06F 21/34 | 235/380 |
| 7,584,153 B2* | 9/2009 | Brown | G07F 7/1083 | 235/380 |
| 7,587,502 B2* | 9/2009 | Crawford | A63F 13/12 | 463/42 |
| 7,587,756 B2* | 9/2009 | Peart | G06Q 20/04 | 380/232 |
| 7,636,694 B1* | 12/2009 | Wankmueller | G06Q 20/108 | 705/64 |
| 7,711,586 B2* | 5/2010 | Aggarwal | G06Q 10/02 | 700/14 |
| 7,827,115 B2* | 11/2010 | Weller | G06Q 20/02 | 705/44 |
| 8,123,123 B1* | 2/2012 | Doland | G06F 21/57 | 235/379 |
| 8,130,961 B2* | 3/2012 | Machani | G06Q 20/3829 | 380/277 |
| 8,255,688 B2* | 8/2012 | Wankmueller | H04L 9/3273 | 713/168 |
| 8,266,441 B2* | 9/2012 | Inskeep | G06Q 20/341 | 713/185 |
| 8,341,397 B2* | 12/2012 | Leedom, Jr. | H04L 63/068 | 705/44 |
| 8,527,427 B2* | 9/2013 | Wankmueller | G06Q 20/40 | 235/379 |
| 8,655,789 B2* | 2/2014 | Bishop | G06Q 20/10 | 705/64 |
| 2001/0027441 A1* | 10/2001 | Wankmueller | G06Q 20/04 | 705/41 |
| 2001/0044777 A1* | 11/2001 | Haley | G06Q 20/1085 | 705/43 |
| 2002/0018585 A1* | 2/2002 | Kim | G06K 9/00067 | 382/125 |
| 2002/0049658 A1* | 4/2002 | Davidson | G06Q 40/04 | 705/37 |
| 2002/0062277 A1* | 5/2002 | Foster | G06Q 30/06 | 705/38 |
| 2002/0069177 A1* | 6/2002 | Carrott | G06Q 20/10 | 705/64 |
| 2002/0107799 A1* | 8/2002 | Hoshino | G06Q 20/105 | 705/41 |
| 2002/0111919 A1* | 8/2002 | Weller | G06Q 20/02 | 705/67 |
| 2002/0147658 A1* | 10/2002 | Kwan | G06Q 20/04 | 705/16 |
| 2002/0164031 A1* | 11/2002 | Piikivi | G06Q 20/12 | 380/270 |
| 2003/0055785 A1* | 3/2003 | Lahiri | G06Q 20/04 | 705/41 |
| 2003/0061170 A1* | 3/2003 | Uzo | G06Q 20/06 | 705/64 |
| 2003/0080183 A1* | 5/2003 | Rajasekaran | G06Q 20/02 | 235/379 |
| 2003/0095791 A1* | 5/2003 | Barton | H04N 5/765 | 386/230 |
| 2003/0204726 A1* | 10/2003 | Kefford | G06F 21/42 | 713/171 |
| 2004/0064351 A1* | 4/2004 | Mikurak | G06Q 10/087 | 705/22 |
| 2004/0232220 A1* | 11/2004 | Beenau et al. | | 235/380 |
| 2005/0033688 A1* | 2/2005 | Peart | G06Q 20/04 | 705/39 |
| 2005/0043997 A1* | 2/2005 | Sahota | G06Q 20/10 | 705/16 |
| 2005/0080677 A1* | 4/2005 | Foss, Jr. | G06F 21/31 | 705/16 |
| 2005/0101295 A1* | 5/2005 | Rupp | G06Q 20/04 | 455/411 |
| 2005/0119978 A1* | 6/2005 | Ates | G06Q 20/04 | 705/67 |
| 2005/0171898 A1* | 8/2005 | Bishop | G06Q 20/00 | 705/39 |
| 2005/0215306 A1* | 9/2005 | O'Donnell et al. | | 463/17 |
| 2006/0012473 A1* | 1/2006 | Bishop | G06Q 20/04 | 340/539.1 |
| 2006/0085844 A1* | 4/2006 | Buer | H04L 63/068 | 726/4 |
| 2006/0177065 A1* | 8/2006 | Halbert | H04L 9/0662 | 380/277 |
| 2006/0218098 A1* | 9/2006 | Walker | G06Q 20/04 | 705/50 |
| 2006/0230112 A1* | 10/2006 | Henderson | H04L 51/04 | 709/206 |
| 2006/0242698 A1* | 10/2006 | Inskeep | G06Q 20/341 | 726/20 |
| 2006/0278697 A1* | 12/2006 | Lovett | G06Q 20/24 | 235/380 |
| 2007/0037552 A1* | 2/2007 | Lee | G06Q 20/04 | 455/410 |
| 2007/0077916 A1* | 4/2007 | Saito | G06Q 20/425 | 455/411 |
| 2007/0079135 A1* | 4/2007 | Saito | G06F 21/35 | 713/183 |
| 2007/0125840 A1* | 6/2007 | Law | G06Q 20/10 | 235/379 |
| 2007/0130463 A1* | 6/2007 | Law | G06F 21/34 | 713/168 |
| 2007/0136211 A1* | 6/2007 | Brown | G07F 7/1083 | 705/75 |
| 2007/0183593 A1* | 8/2007 | Yoshida | H04L 9/0852 | 380/28 |
| 2007/0220597 A1* | 9/2007 | Ishida | G06Q 20/12 | 726/8 |
| 2007/0260544 A1* | 11/2007 | Wankmueller | G06Q 20/40 | 705/44 |
| 2007/0277044 A1* | 11/2007 | Graf | G07F 7/1008 | 713/185 |
| 2008/0011823 A1* | 1/2008 | Patel | G06Q 20/10 | 235/375 |
| 2008/0029593 A1* | 2/2008 | Hammad | G06Q 20/04 | 235/380 |
| 2008/0034221 A1* | 2/2008 | Hammad | G06Q 20/085 | 713/190 |
| 2008/0040274 A1* | 2/2008 | Uzo | G06Q 20/40 | 705/44 |
| 2008/0071938 A1* | 3/2008 | Takaoka | H04N 1/00344 | 710/13 |
| 2008/0103984 A1* | 5/2008 | Choe | G06Q 20/20 | 705/76 |
| 2008/0167079 A1* | 7/2008 | Garrettson et al. | | 455/566 |
| 2008/0168543 A1* | 7/2008 | von Krogh | G06F 21/31 | 726/6 |

(56) References Cited

U.S. PATENT DOCUMENTS

| | | | |
|---|---|---|---|
| 2008/0168544 A1* | 7/2008 | von Krogh | G06F 21/34 726/6 |
| 2008/0208746 A1* | 8/2008 | Royyuru | G06Q 20/10 705/44 |
| 2008/0208758 A1* | 8/2008 | Spiker | G06F 21/83 705/70 |
| 2008/0208759 A1* | 8/2008 | Royyuru | G06Q 30/06 705/72 |
| 2008/0301056 A1* | 12/2008 | Weller | G06Q 20/02 705/67 |
| 2009/0030845 A1* | 1/2009 | Hurry | G06Q 20/3829 705/71 |
| 2009/0063802 A1* | 3/2009 | Johnson | G06F 21/31 711/164 |
| 2009/0157555 A1* | 6/2009 | Biffle | G06Q 20/023 705/67 |
| 2009/0287742 A1* | 11/2009 | Woolston | G06Q 10/107 |
| 2010/0031051 A1* | 2/2010 | Machani | G06Q 20/3829 713/181 |
| 2010/0057619 A1* | 3/2010 | Weller | G06Q 20/02 705/67 |
| 2010/0106649 A1* | 4/2010 | Annan | G06Q 20/32 705/67 |
| 2010/0287382 A1* | 11/2010 | Gyorffy | G06F 21/36 713/185 |
| 2010/0293099 A1* | 11/2010 | Pauker | G06Q 20/20 705/67 |
| 2011/0016054 A1* | 1/2011 | Dixon | G06Q 20/027 705/75 |
| 2011/0047036 A1* | 2/2011 | Foran-Owens | G06Q 20/204 705/17 |
| 2011/0099384 A1* | 4/2011 | Grange | H04L 9/0897 713/184 |
| 2011/0101109 A1* | 5/2011 | Bona | G06K 19/07709 235/492 |
| 2011/0302021 A1* | 12/2011 | Reid | G06Q 20/20 705/14.35 |
| 2012/0028609 A1* | 2/2012 | Hruska | G06Q 20/3674 455/411 |
| 2012/0137131 A1* | 5/2012 | Lu | H04L 9/3228 713/168 |
| 2012/0143770 A1* | 6/2012 | Pauker | G06Q 20/02 705/71 |
| 2012/0150742 A1* | 6/2012 | Poon | G06Q 20/20 705/44 |
| 2012/0185398 A1* | 7/2012 | Weis | G06Q 20/20 705/75 |
| 2012/0197807 A1* | 8/2012 | Schlesser | G06Q 20/3829 705/71 |
| 2012/0226582 A1* | 9/2012 | Hammad | G06F 21/34 705/26.41 |
| 2013/0262317 A1* | 10/2013 | Collinge | G06Q 20/3823 705/71 |
| 2014/0101055 A1* | 4/2014 | Grissom | G06Q 20/027 705/71 |
| 2014/0136418 A1* | 5/2014 | Fielder | G06Q 20/206 705/65 |
| 2015/0235211 A1* | 8/2015 | Hurry | G06Q 20/40975 705/75 |
| 2015/0287031 A1* | 10/2015 | Radu | G06K 7/10009 705/18 |
| 2016/0063496 A1* | 3/2016 | Royyuru | G06Q 20/209 705/71 |
| 2016/0110711 A1* | 4/2016 | Collinge | G06Q 20/3829 705/71 |
| 2017/0011395 A1* | 1/2017 | Pillai | G06Q 20/3829 |

* cited by examiner

PROCESSING OF FINANCIAL TRANSACTIONS USING DEBIT NETWORKS

CROSS REFERENCE TO RELATED APPLICATION

This application is related to commonly assigned, concurrently filed U.S. patent application Ser. No. 11/677,967, entitled, "MANAGEMENT OF FINANCIAL TRANSACTIONS USING DEBIT NETWORKS," filed by Vijay Royyuru and Robert Freisheim, the entire disclosure of which is incorporated herein by reference for all purposes.

BACKGROUND OF THE INVENTION

This application relates generally to financial transactions. More specifically, this application relates to processing of financial transactions using debit networks.

In a modern commercial environment, there is an array of different financial products that consumers have available to them in executing financial transactions. Some of the more prevalent forms of transactions may be characterized as credit transactions, debit transactions, and stored-value transactions. Each of these transactions differs in the manner in which access to funds is provided to the consumer. For example, credit transactions are supported by funds provided by a creditor to a customer. The principal example of such credit transactions are credit-card transactions in which the creditor issues a card to the customer that the customer may use as a presentation instrument to identify a credit account. When the transaction is executed, funds are drawn against the credit account, which usually has a pre-established credit limit, to support the transaction.

The other major types of financial transactions also make use of presentation instruments. A stored-value transaction is one in which funds have been specifically set aside and associated with a presentation instrument so that they may be used to support a transaction. In most cases, such stored-value instruments are anonymous in that the funds are associated only with the instrument and not with any particular person. This has the advantage that such instruments may be easily transferred and they find wide utility as gift cards. This gift aspect is frequently reinforced by imposing restrictions on the merchant with whom transactions may be executed with the set-aside funds.

Debit transactions may also make use of a presentation instrument and are similar to stored-value transactions in that specifically identified funds are used to support the transactions. The source of funds for a debit transaction is specifically identified with a holder of the account that holds the funds and this account is usually a demand-deposit account maintained at a financial institution. As such, the funding of the account varies over time as deposits and withdrawals are made from the account in response to receipt of wages, paying bills, etc. Debit accounts generally differ from stored-value accounts in that the account owner is provided with open-ended access, with all activity being based on the currently available funds level. Stored-value transactions might be considered to be a subset of debit transactions in which some money is set aside, but where there is no free access to funds in the account. For instance, some stored-value accounts do not allow additional deposits, permitting only withdrawals to be made from the accounts in accordance with governing restrictions of the accounts.

The ability to transfer funds from a demand-deposit or other type of account in such a short time period is enabled by the use of one or more electronic networks provided as part of a financial infrastructure. Communications routed over these networks permit decisions to be made in real time whether the criteria for executing a transaction—valid accounts are identified, there are sufficient funds in the supporting account, identity-verification protocols have been satisfied, etc.—are met. Such debit transactions are of particular interest to many merchants because they remove the element of trust that is required of other transactions. The time lag of check transactions runs the risk that the check will be refused, forcing the merchant to expend time and effort in recovering funds due for a previously executed transaction. And while credit transactions usually involve some authorization process, there are mechanisms that may be used after the fact to prevent the payment from being made. From the perspective of merchants, debit transactions have the advantage that funds are received substantially contemporaneously with execution of the transaction itself. If there are later disputes regarding the transaction, the merchant is in the superior position by having possession of the funds at that time.

There is accordingly a general need in the art for improved methods and systems of supporting debit transactions.

BRIEF SUMMARY OF THE INVENTION

Embodiments of the invention provide methods and systems for executing financial transactions between customers and merchants. In a first set of embodiments, an identifier of a financial account is received from the customer at a merchant system. A one-time password is also received from the customer at the merchant system, with the customer having been provided with the one-time password by a mobile electronic device or a contactless presentation instrument. A cryptogram is generated, with the cryptogram comprising the identifier of the financial account encrypted using the one-time password. An authorization request is formulated at the merchant system. The authorization request comprises the cryptogram and transaction information describing at least a portion of the financial transaction. The authorization request is transmitted from the merchant system to an authorization processor for authorization of the financial transaction.

In a second set of embodiments, an encrypted authorization request is received from a merchant system at an authorization processor, with the authorization request having been encrypted by application of a one-time password provided to the customer by a debit presentation instrument. The authorization request is decrypted. A financial account is identified from the decrypted authorization request. Transaction information describing at least a portion of the financial transaction is determined from the decrypted authorization request. Authenticity of the transaction information is determined by validating the one-time password. It is determined whether the identified financial account is capable of supporting the financial transaction based on the transaction information.

In either set of embodiments, there may be a number of specific features. For example, the identifier may comprise an account number of the financial account. In other instances, it may comprise an identification number extracted from a presentation instrument, with the identification number being translated to an account number of the financial account. The one-time password may comprise a two-factor one-time password. In certain cases, the one-time password is a second one-time password provided to the customer by the mobile electronic device after passage of an expiry time after a first one-time password is provided to the customer by the mobile electronic device. In some cases, an intermediate authentication processor translates the identifier to a primary account number or card number that the authorization processor recognizes. In certain embodiments, a personal identification number is received from the customer at the merchant system, with the authorization request further comprising the personal identification number. Cryptographic keys used to generate the one-time password on the presentation instrument, and to validate the one-time password on the authentication processor, may either be generated on the presentation instrument and transferred to the authentication processor, or be generated on the authentication processor and transferred to the presentation instrument.

The merchant system may sometimes comprise an Internet web server and, at other times, comprises a merchant point-of-sale device. The mobile electronic device may comprise a cellular telephone. In some embodiments, the transaction information comprises a total cost for the financial transaction, or other descriptional data elements of the transaction such as location, terminal identifier, terminal sequence number, date, and/or time.

Methods of the invention may also be embodied by a computer-readable storage medium having a computer-readable program embodied therein for directing operation of a merchant system or of an authorization processor, either of which may include a communications system, a processor, and a storage device. The computer-readable program includes instructions for operating the respective devices to implement the methods as described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide a number of different techniques for executing debit transactions. Some of these embodiments involve the use of "contactless" transactions that make use of a presentation instrument. In many instances, such a presentation instrument may take a form that is conventional in appearance, such as in the form of a credit-card-sized card, or may take a less conventional form, examples of which include key fobs or other kinds of instruments. Contactless transactions may be executed in some embodiments with a mobile electronic device. Transactions that are "contactless" are those that are executed with only wireless interaction between the presentation instrument and a merchant point-of-sale device. Conventional debit transactions involve contact between these elements because account information is conventionally stored on one or more tracks of a magnetic stripe that is affixed to the presentation instrument. These tracks are read by swiping the presentation instrument through a magnetic-stripe reader comprised by the point-of-sale device. While some forms of contactless transaction have been attempted in the past, these have involved such techniques as optically reading a bar code from a presentation instrument, often requiring that certain information conventionally stored on the magnetic-stripe tracks be stored instead in a database that forms part of the financial architecture, i.e. either locally to the point-of-sale device or at some other location in communication with the point-of-sale device. Other forms of contactless transactions have involved transmission of the same data from the presentation instrument to a the merchant point-of-sale device, as would have been transmitted for a magnetic-stripe card. There are also a number of security issues associated with such arrangements. Embodiments of the invention use a structure in which both the information-management and security issues are better addressed.

Other embodiments of the invention provide techniques for using mobile electronic devices in executing Internet-based transactions. Examples of mobile electronic devices that may be used in different embodiments include mobile telephones, personal digital assistants, and the like. In some instances, the description may refer by way of example to the use of mobile telephones, it being understood that such references are intended merely to be illustrative and not to be limiting.

Figure 1:
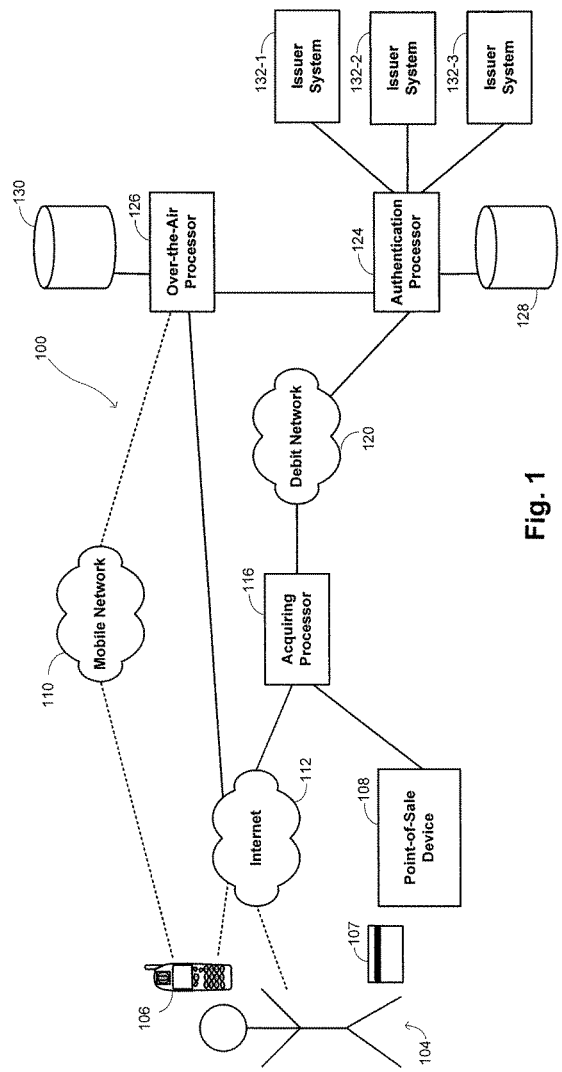
FIG. 1 is a schematic illustration of a financial architecture within which embodiments of the invention may be executed.

These various embodiments may be implemented in a financial architecture like that shown in FIG. 1. In this illustration, the architecture 100 is structured generally around a debit network 120, but it should be recognized that this is a depiction of only a portion of a larger financial infrastructure within which the architecture may be embodied. Other financial networks used in implementing credit, stored-value, or other types of transactions may be provided in communication with some of the elements shown in this drawing, even if not explicitly indicated. The debit network 120 generally comprises a private electronic communications network that implements security protocols commensurate with the sensitive nature of the financial information that is routed through the network 120. Such security protocols and methods for their implementation are well known to those of skill in the art.

Interactions with the debit network 120 are provided through a variety of different kinds of processors that are interfaced with the network. For example, front-end interactions may take place through an acquiring processor 116 that is in communication with the Internet 112 and/or point-of-sale devices 108 that are used in execution of the underlying financial transactions. The back-end interactions may take place with an authentication processor 124, the specific functionality of which is described in further detail for some embodiments below.

Other communications within the architecture 100 may take place through a mobile network 110 that is interfaced with an over-the-air processor. The authentication processor 124 and over-the-air processor 126 may each make use of data stored in respective databases 128 and 130.

Endpoints of the architecture 100, at least from the perspective of the kinds of transactions discussed herein, are a customer 104 who interacts with the Internet 112 and/or point-of-sale device 108 to interface with the front end and issuer systems 132 that are in communication with the authentication processor 124. The issuer systems 132 may act as authorization processors as described in specific detailed embodiments below. In some instances, the customer 104 may have supplementary interactions with the architecture through a mobile electronic device 106 and/or may use a contactless presentation instrument 107 depending on specific implementations. These interactions proceed through the mobile network 110 that is accessible by the mobile electronic device and that is in communication with the over-the-air processor 128. Each of the issuer systems 132 is a computational system that is operated by an issuer of the presentation instrument or that manages the account used to support the transaction. Such issuers are thus frequently financial institutions such as banks, credit unions, or the like, that maintain demand-deposit or other types of financial accounts that may be used to support debit transactions.

Figure 2:
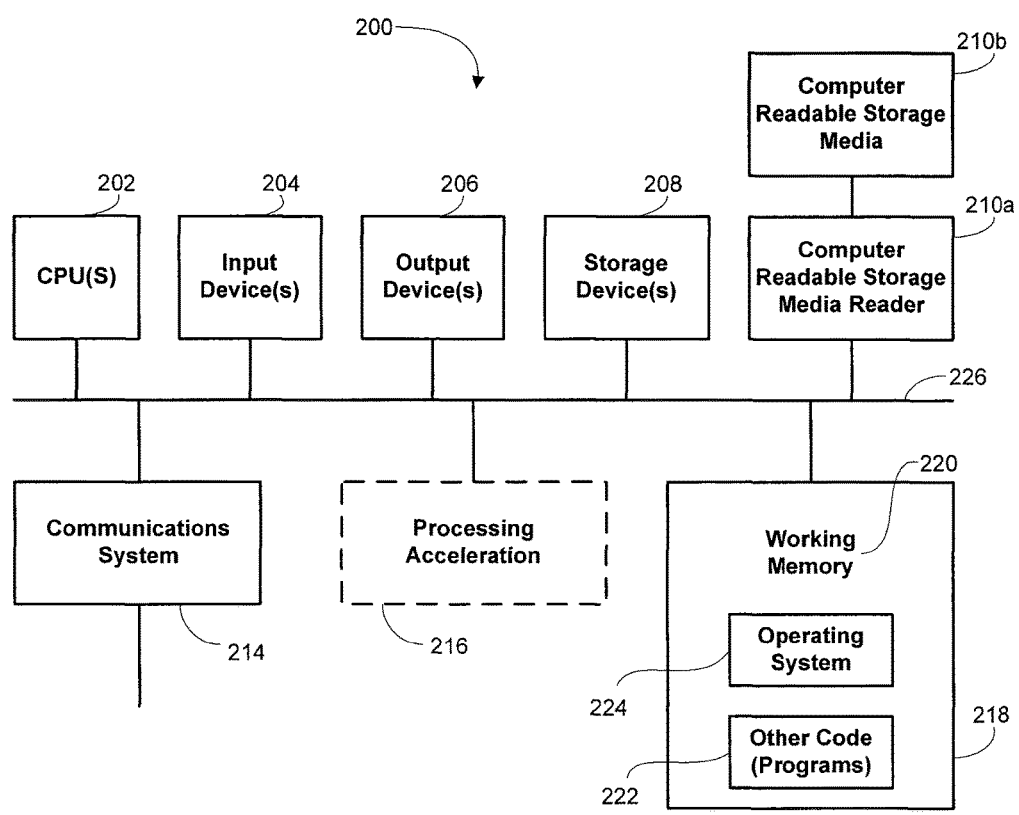
FIG. 2 is a schematic illustration of a computational unit that may be included as parts of elements of the financial architecture of FIG. 1.

FIG. 2 provides a schematic illustration of a physical structure that may be used to implement different computational systems that may form part of the architecture 100 of FIG. 1. For example, the computational systems 200 shown in FIG. 2 might correspond to a structure used for the mobile electronic device 106, for the contactless presentation instrument 107, for the acquiring processor 116, for the authentication processor 124, for the over-the-air processor 126, and/or for any of the issuer systems 132 in different embodiments. FIG. 2 broadly illustrates how individual system elements may be implemented in a separated or more integrated manner. The computational system 200 is shown comprised of hardware elements that are electrically coupled via bus 226, including a processor 202, an input device 204, an output device 206, one or more storage devices 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged within the architecture 100 to implement embodiments described herein.

The computational system 200 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware (perhaps including tamper-resistant storage media for secure storage of cryptographic keys), software (including portable software, such as applets), or both. Further, connection to other computing devices such as network input/output devices may be employed.

To participate in financial transaction methods of the invention, a customer 104 may first be enrolled. Such enrollment establishes sets of data that may be used and manipulated in implementing embodiments of the invention. Such data may be stored in the databases 128 and/or 130 as well as on the presentation instrument and/or mobile electronic device 106. A general overview of how enrollment may be accomplished in embodiments that use physical presentation instruments is provided with the flow diagram of FIG. 3, while a corresponding overview of how enrollment may be accomplished in embodiments that make use of mobile electronic devices is illustrated with the flow diagram of FIG. 4.

When contactless-card presentation instruments are issued by financial institutions, they are typically prepared using batch processes. Block 304 of FIG. 3 accordingly indicates that a production file is prepared by an issuer processor. Such a production file typically includes information defining the nature of the individual presentation instruments. For instance, when the presentation instruments comprise cards, the production file may include numbers to be embossed on the cards. It may also include information identifying the individuals to be associated with each instrument, as well as identifying the financial account that will be used to support transactions executed with the instruments. A manufacturer of presentation instruments may also produce blank versions of the instruments at block 308. For example, when the presentation instruments comprise cards, blank versions of the cards may be prepared by a card manufacturer that include a debit application that will be executed when performing debit transaction. Irrespective of their specific form, each of these instruments is equipped with structure that enables them to be used in contactless communications. For example, the instrument may have an embedded electromagnetic chip that receives and transmits electromagnetic signals at radio or other frequencies. Once created, these instruments are delivered by the card manufacturer to the card producer at block 312.

Having received the production file and the blank cards, the card producer may engage in personalization processes at block 316 by writing information to the blank instruments in accordance with the specifications in the production file. This initial personalization may include both direct physical alterations to the instrument, such as when cards are embossed with card numbers, and may additionally include writing data to storage maintained on the instrument itself. For instance, card numbers, cryptographic keys, account or identification numbers, and/or merchant loyalty identification numbers, in addition to other data, may additionally be stored as data on the card so that this information may be accessed and transmitted as appropriate in implementing embodiments of the invention.

In addition to this personalization information, the card producer may implement certain encryption protocols that will be used in enhancing the security of transactions executed with the instruments. In one implementation, public-key-private-key encryption is used within a public-key infrastructure ("PKI"). Consistent with such an infrastructure, at block 320 the card producer generates a PKI key pair for each card, referred to herein as the "card encryption key pair." The public key of the pair is transmitted by the card producer, together with an indication of the card number that it refers to, to the authentication processor 124 at block 324 and the private key of the pair is retained on the card. Having been so prepared, the instrument is ready for transmission to the customer at block 328.

In addition to this use of the production file by the card producer in preparing the instruments, the production file may by provided to the authentication processor 124 at block 132. The combination of the production file and the key information received from the card producer provides the authentication processor 124 with sufficient information to authenticate transactions as they are performed with the instruments. Both of these forms of information may be stored in database 128. The individual instruments may be activated after receipt by customers at block 336 using a process defined by the issuer producer. In some instances, this activation is performed by interactions between the customer 104 and the authentication processor 124, such as may be achieved over the Internet, through the use of a voice-response unit, or the like. One purpose of this activation step is to reduce the risk of fraud by confirming receipt of the instrument by the correct customer 104. A comparison can accordingly be made between information provided by the customer 104 during this activation with information extracted from the production file by the authentication processor 124.

In some instances, the presentation instruments may be created with certain redundancies of information. This is especially suitable, for example, in embodiments where a card is to be equipped for both contactless and conventional transactions. Such multifunction cards may include an electromagnetic chip such as a radio-frequency identification chip to perform contactless transactions as well as a magnetic stripe or other mechanism that stores information that can be read by a device in contact with the card.

Some aspects of the enrollment shown in FIG. 4 for enrolling a mobile electronic device 106 are similar to parts of the enrollment described in connection with FIG. 3. The method may begin, for example, with the customer visiting an Internet web site managed by the over-the-air processor 126 at block 404. This web site acts as a provisioning web site that may be used by the over-the-air processor 126 in effecting enrollment functions. The customer provides enrollment information at block 408. Such enrollment information may comprise, for example, an identification number that generally corresponds to the card number of a debit card in more conventional debit transactions, in addition to the access number for the mobile device 106 to be enrolled.

This information is used by the over-the-air processor 126 at block 412 to enroll the identification number with the authentication processor 124 at block 412. An exchange of verification information acts to confirm that the correct mobile device 106 is enrolled. One example of such an exchange shown in FIG. 4 involves the transmission of a short-message-service ("SMS") message to the mobile device 106 identified by the access number provided at block 408. In one instance, the SMS message includes a provisioning URL that is used by the customer to confirm the verification information.

At block 424, the over-the-air processor 126 downloads a software debit application to the mobile device 106. The debit application resident on the mobile electronic device 106 generates a cryptographic key at block 428. This cryptographic key is a direct analogue of the key discussed in connection with FIG. 3 for the generation of presentation instruments. As indicated at block 432, the debit application transmits the cryptographic key using the mobile device to the over-the-air process 126. The over-the-air processor 126 then transmits it to the application processor 124 at block 436, resulting in the authentication processor 124 now having all the requisite information to process a transaction in the manner described below.

Figure 4:
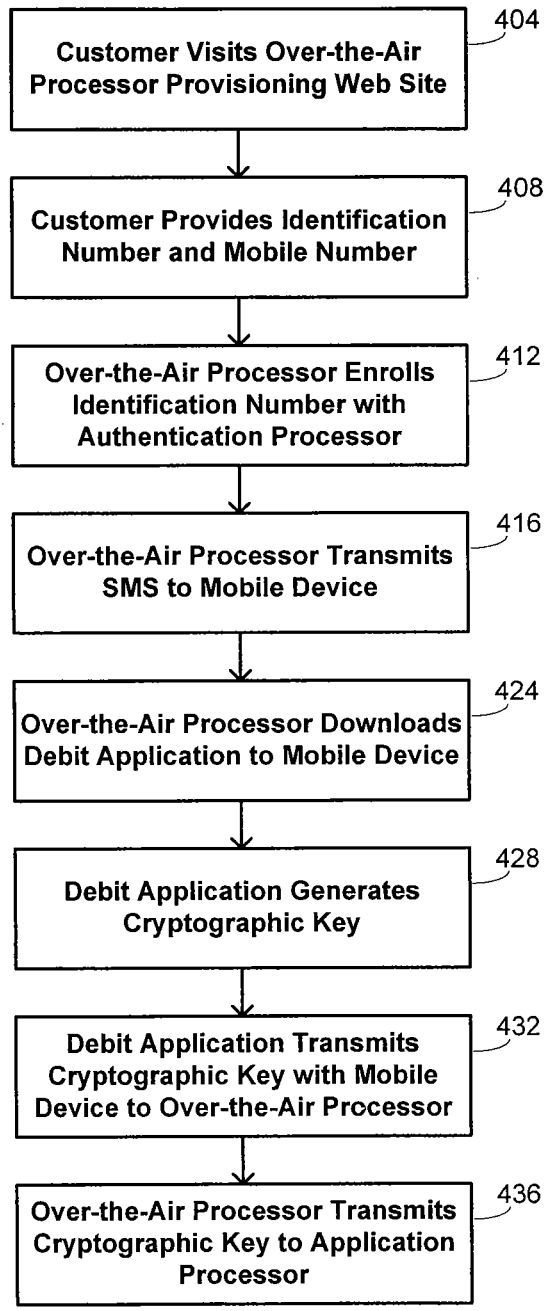
FIG. 4 is a flow diagram summarizing methods of enabling mobile electronic devices to be used by customers in debit transactions.
Figure 5:
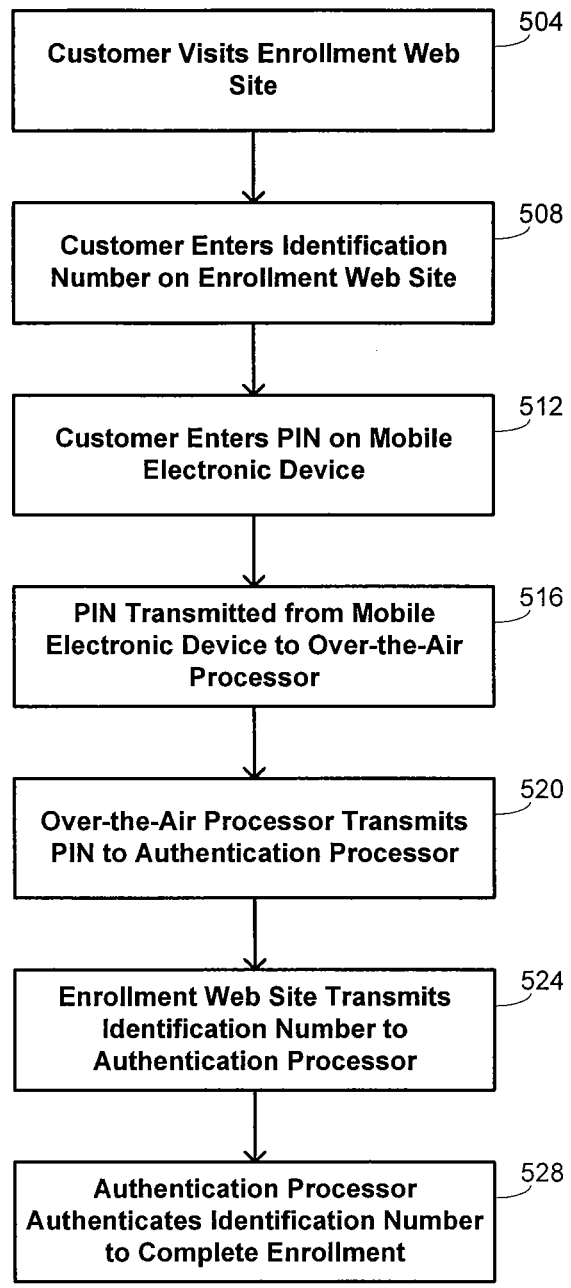
FIG. 5 is a flow diagram summarizing enrollment methods used in some embodiments of the invention.

FIG. 5 is a flow diagram that summarizes a provisioning using the over-the-air processor 126 that may be used in some embodiments. Such provisioning permits enrollment to be accomplished by the customer using a combination of information provided over an Internet connection to a web site and information provided over a mobile network 110 from a mobile electronic device 106. The method begins at block 504 with the customer visiting the enrollment web site. Once connected to this site, the customer enters the identification number at block 508. Similar to the description of the processes of FIG. 4, such an identification number may correspond to a more conventional card number of a debit card.

In addition to this information, the customer enters the PIN on the mobile electronic device 106 using an interface for doing generated for display on the mobile electronic device. This information is transmitted from the mobile electronic device 106 over the mobile network 110 to the over-the-air processor 126 at block 516. The combination of information is provided to the authentication processor 124, with the over-the-air processor 126 transmitting the PIN to the authentication process 124 at block 520 and the enrollment web site transmitting the identification number to the authentication processor 124 at block 524. This combination of information is then used by the authentication processor 124 at block 528 to complete the enrollment of the mobile electronic device 106, permitting it subsequently to be used as a presentation instrument.

Figure 3:
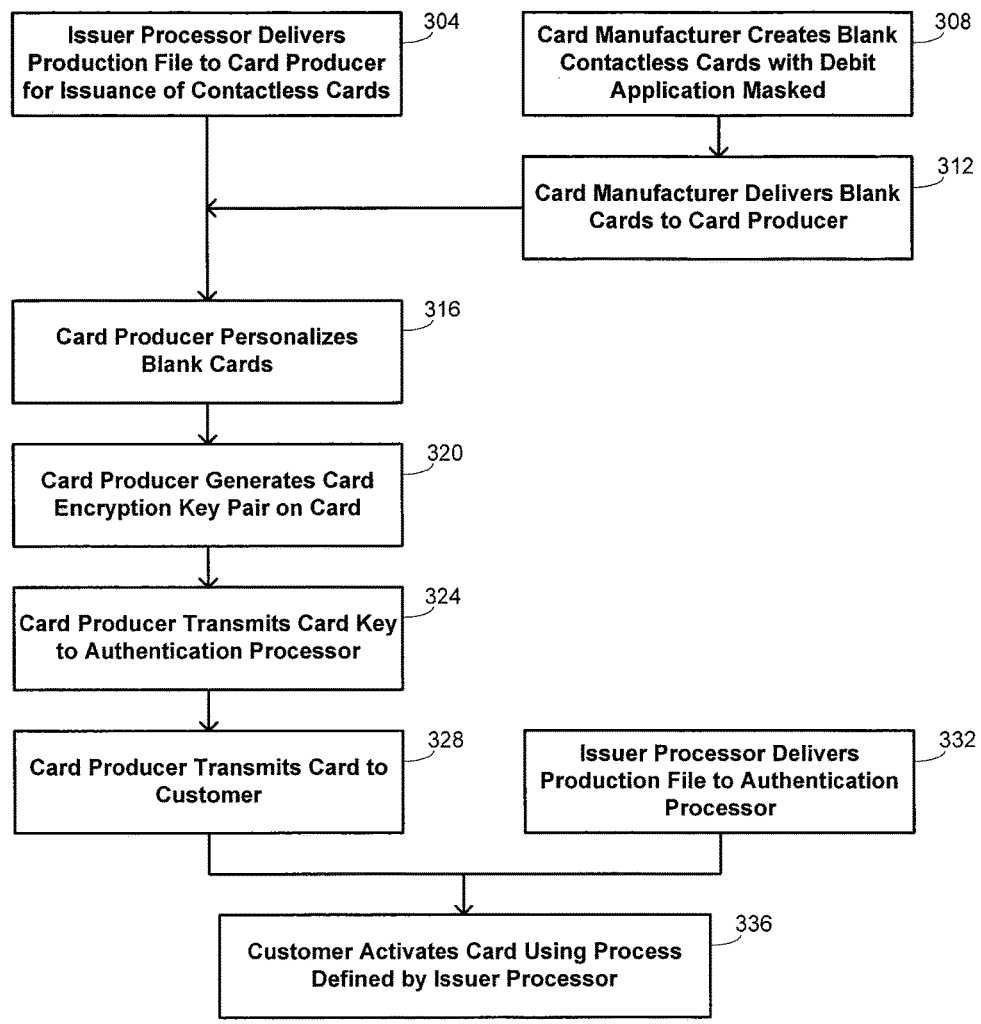
FIG. 3 is a flow diagram summarizing methods of providing cards suitable for use in contactless debit transactions to customers.
Figure 6:
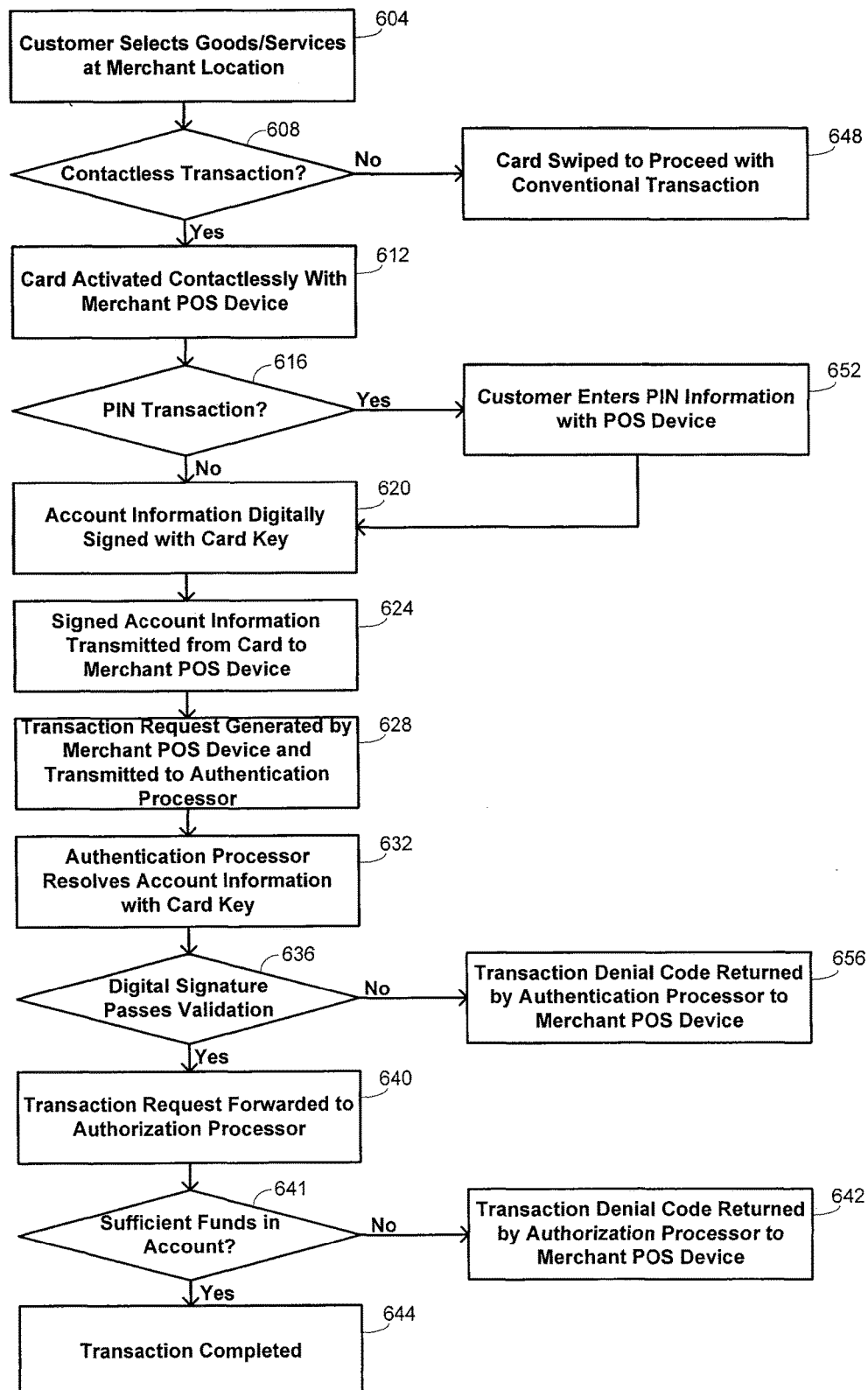
FIG. 6 is a flow diagram summarizing methods of executing debit transactions using the cards provided with the method of FIG. 3.
Figure 7:
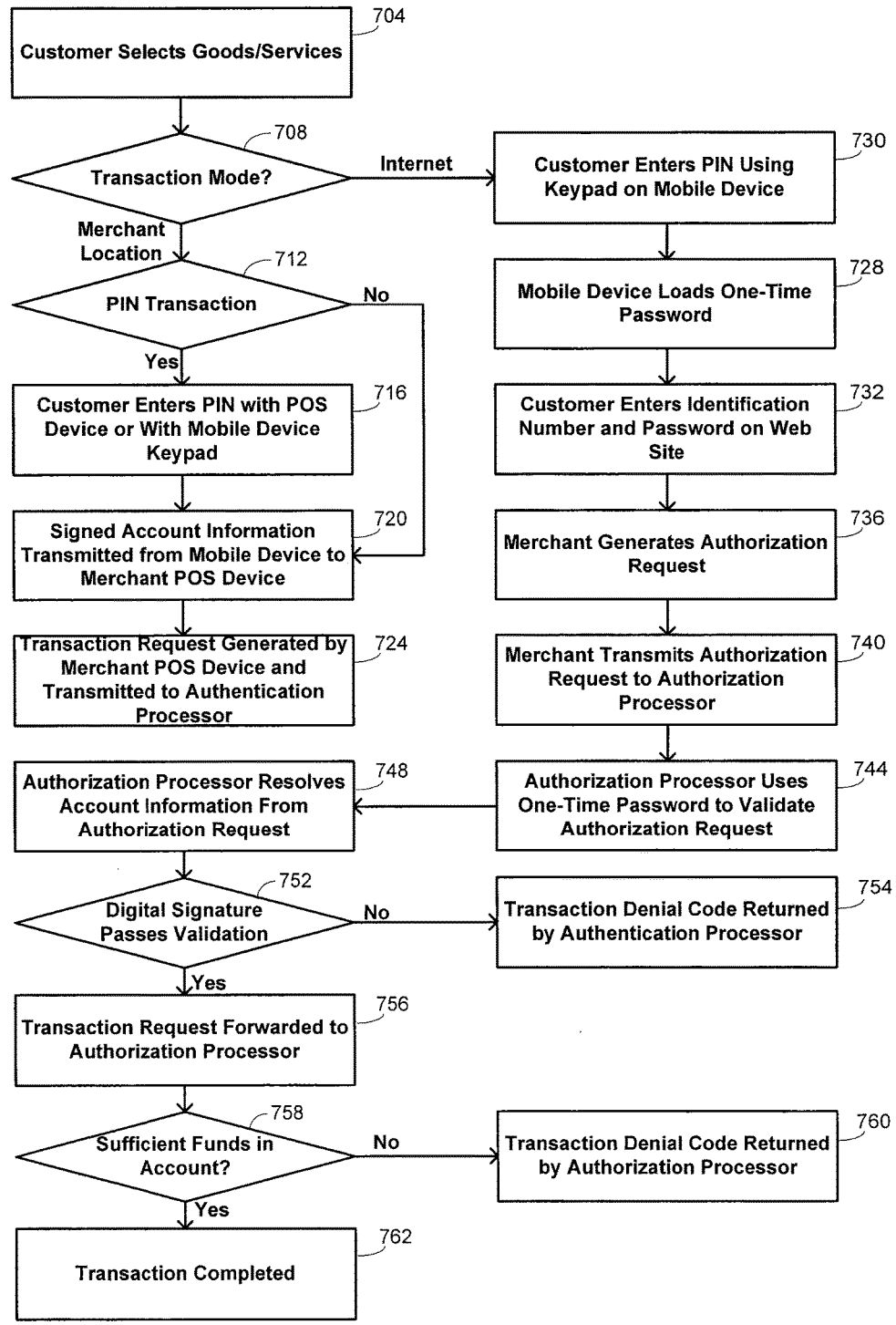
FIG. 7 is a flow diagram summarizing methods of executing debit transactions using mobile electronic devices configure according to the method of FIG. 4.

FIGS. 6 and 7 are flow diagrams that illustrate methods that may be implemented to support debit transactions using the contactless presentation instruments or mobile electronic devices enrolled in accordance with FIGS. 3 and 4. FIG. 6 provides an illustration of methods for executing and supporting debit transactions made using a contactless card. Such transactions generally take place at a physical merchant location, with the drawing accordingly indicating that the method begins at block 604 with a customer selecting goods and/or services for purchase at the merchant location. If the transaction is not to be completed as a contactless transaction, the instrument may be swiped at block 648 to read information from a magnetic stripe or otherwise read with a device in contact with the instrument to proceed with a conventional form of transaction.

If the transaction is to be executed as a contactless transaction, the instrument is activated with a contactless mechanism at block 612. It is anticipated that such activation will normally be accomplished using an electromagnetic mechanism, although any contactless mechanism that may be implemented may be used in alternative embodiments.

The flow diagram also accounts for the fact that different kinds of transactions may be supported as contactless transactions. One distinction that may be made among transactions is the need to supply a personal identification number ("PIN") as evidence of authorization to use the presentation instrument. The PIN is a number that is preferably kept secret by the account owner so that that person is the only one authorized to use the instrument, but in practice PIN's are sometimes shared with family members or friends who are authorized by the account holder to execute transactions with the instrument. While the PIN offers a higher level of security for transactions, there are embodiments in which transactions will be permitted without verification of a PIN. These transactions are typically smaller transactions, so that a particular embodiment might permit transactions to be executed without a PIN when they are less than $25 but require a PIN when the transaction size exceeds $25. If the transaction is to be a PIN transaction as checked at block 616, the customer enters the PIN information with the point-of-sale device 108 at block 652.

To execute any transaction, whether it requires a PIN or not, account information is retrieved contactlessly from the presentation instrument by the point-of-sale device 108. The content of this information may vary in different embodiments, with it including or not including PIN information in accordance with the type of transaction being executed. The account information is signed digitally with the card key that is resident on the presentation instrument at block 620. This signed account information is transmitted at block 624 in a contactless way from the presentation instrument to the point-of-sale device 108. Merchant point-of-sale devices 108 may deliver transaction data elements to the contactless presentation instrument during the contactless transaction session and such data elements may be included in derivation of the transaction digital signature.

With this information, the merchant point-of-sale device 108 has sufficient information to generate a transaction request at block 628 by combining the signed account information with transaction information. The transaction information usually specifies at least a total amount for the transaction and an account under the control of the merchant to which the transaction amount is to be transferred. In certain circumstances, the transaction information may include other information, such as the location at which the transaction is to be executed, the specific items comprised by the transaction, and the like. The resulting transaction request is transmitted by the merchant point-of-sale device 108 to the authentication processor 124, which is then equipped to parse the transaction request to extract the information needed to make an authentication decision. The customer-account information comprised by the transaction request may be resolved with the card public key at block 632, permitting the authentication processor 124 to identify the issuer and specific account to be used in supporting the transaction.

With such a resolution, the decision-making process implemented by the authentication processor 124 may be relatively simple. A check is made by the at block 636 to validate the cryptogram included in the encrypted authorization request transaction. If this authentication check fails, a transaction denial code is returned to the merchant point-of-sale device 108 at block 656 so that the merchant can refuse the transaction or request some other financial support for it from the customer 104.

Upon successful completion of the authentication check at the authentication processor, the authorization request transaction is forwarded to an authorization processor 132 to determine whether there are sufficient funds in the identified account to cover the transaction amount. If there are sufficient funds in the identified account, as checked at block 641, a transaction authorization code is returned by the authentication processor 124 at block to the merchant point-of-sale device 108, indicating to the merchant that the transaction may be completed at block 644. Funds are debited in real time from the customer account and transferred to the control of the merchant by depositing them into the merchant account identified with the transaction request. If there are insufficient funds, a transaction denial code may be returned by the authentication processor 124 to the merchant point-of-sale device 108 at block 642.

In other embodiments, the authorization decision may be more complex than simply considering whether the total transaction amount exceeds the funds available in the customer account. For example, some implementations include item-level restrictions that the funds may be applied to so that the customer is restricted in use of those funds to purchasing only certain approved items. Alternatively, the customer account might be restricted so that its funds can only be applied to transactions executed at certain approved merchants. In each of these and in other circumstances, the decision-making processes applied by the authentication processor 124 may consider the data received as part of the transaction request on this more detailed level to determine whether to authorize the transaction.

A number of aspects of transactions executed using a mobile electronic device as summarized with the flow diagram of FIG. 7 are similar to execution of a contactless transaction. Block 704 indicates that the customer 104 selects goods and/or services to purchase from a merchant at block 704. These goods and services may be purchased at a merchant location or may be purchased remotely such as over the Internet 112, the different transaction types resulting in different processing described below.

A check is accordingly made of the transaction mode at block 708. If the transaction occurs at a merchant location, a check may be made whether to execute the transaction as a PIN or non-PIN transaction. This is indicated at block 712. Often such a decision hinges some characteristic of the transaction like its total size. If the transaction is to be a PIN transaction, the customer may enter the PIN using a keypad comprised by the mobile electronic device 106. This may be included as part of the account information that is digitally signed and transmitted from the mobile device 106 to the merchant point-of-sale device 108 at block 720. This digital signing is similar to the signing performed with contactless cards in FIG. 6 by performing an encryption using the cryptographic key, but is performed by the mobile electronic device 106.

The signed account information is used by the merchant point-of-sale device 108 in generating a transaction request that is then transmitted to the authentication processor at block 724. In addition to the signed account information, the transaction request may include details of the transaction, usually including at least a transaction amount but perhaps sometimes additionally including such information as item-level identifications of the specific goods and services that form part of the transaction.

When an Internet-based transaction is to be performed, the customer may enter the PIN using the keypad on the mobile device at block 730 and the mobile device 106 may load a one-time password at block 728. In some embodiments, the one-time password comprises a two-factor one-time password. Conventionally, a number of different factors may be used to provide security for authentication. For instance, such factors may include something that the customer has, something that the customer knows, and something that the customer is. A two-factor one-time password is based on two such factors. In a particular implementation, the two factors are something that the customer has, such as possession of the presentation instrument, and something that the customer knows, such as the PIN. The customer enters the identification number for his account at block 732 with the password read from the mobile device. This provides sufficient information for the merchant operating the web site to generate an authorization request at block 736. The authorization request is transmitted by the merchant web server to the authentication processor 124 at block 740, permitting the authentication processor 124 to use the one-time password to validate the authorization request at block 744.

Subsequent processing of the transaction is similar to conventional processing, irrespective of whether the authorization request is received from a point-of-sale device 106 or from a merchant web server. The authentication processor resolves the account information from the authorization request at block 748 by applying decryption techniques. If the digital signature fails to pass validation as checked at block 752, then a transaction denial code is returned by the authentication processor 124 at block 754. If the digital signature passes validation, the transaction request is forwarded to the authorization processor 132 at block 756, permitting a check to be made at block 758 whether there are sufficient funds in the identified account. If not, a transaction denial code is returned by the authorization processor 132 is returned at block 760. If both the digital signature pass and there are sufficient funds in the account, the transaction is completed at block 762.

Figure 8:
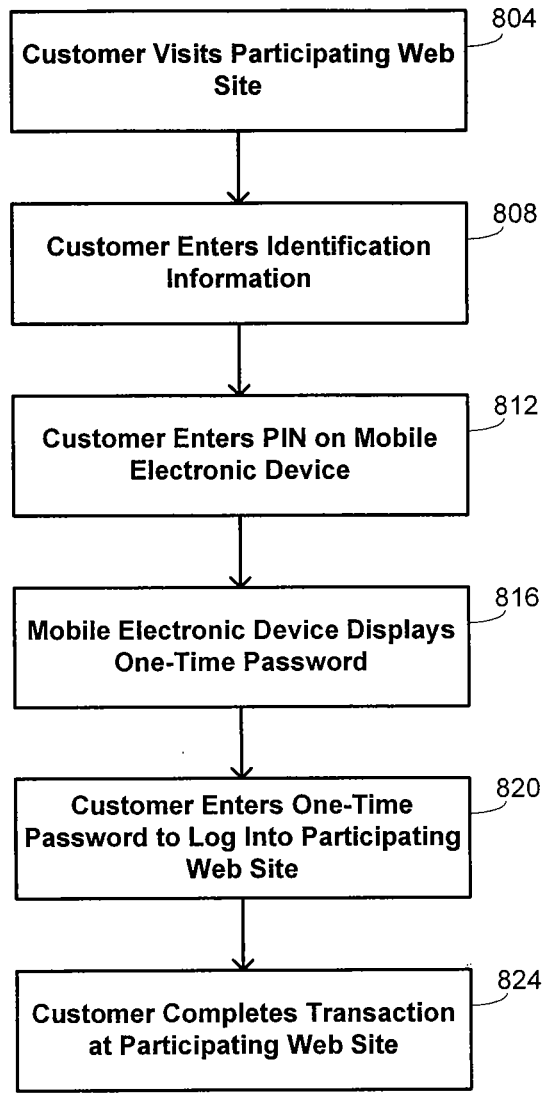
FIG. 8 is a flow diagram summarizing use of a federated authentication web service to execute transactions in accordance with certain embodiments of the invention.
Figure 9:
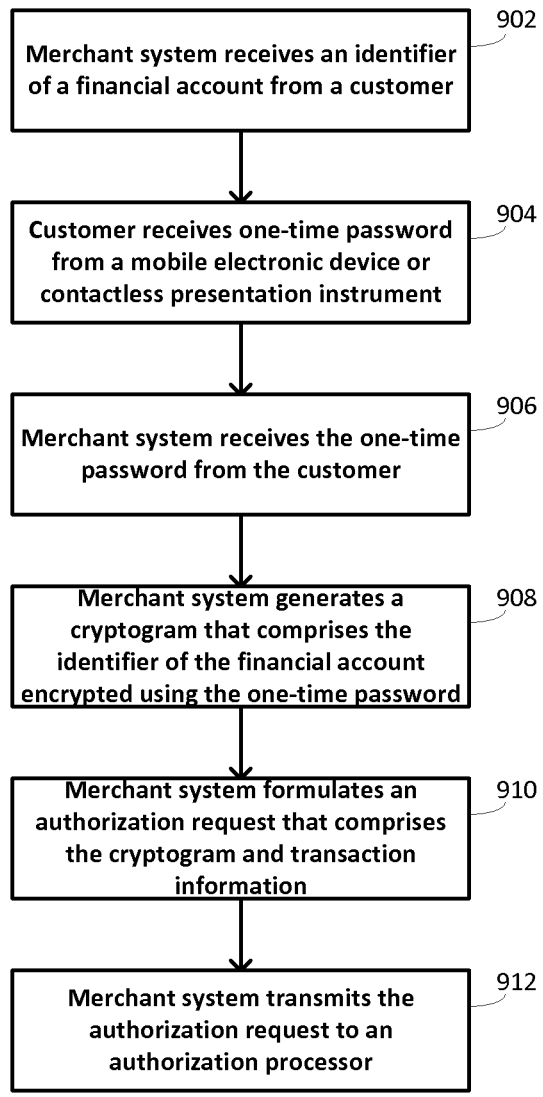
FIG. 9 is a flow diagram summarizing methods of executing financial transactions between customers and merchants.

FIG. 8 is a flow diagram that summarizes methods of executing certain Internet-based transactions. These methods may be implemented using merchants that provide web sites that participate in the program, sometimes referred to herein as implementing "federated authentication." When a customer enters one of these participating web sites, as indicated at block 804, he or she may enter conventional identification information to log into the web site at block 808. Such conventional identification information will frequently take the form of a userid, but may use other forms of identification known in the art. To complete the customer's authentication, the customer enters the PIN for the presentation instrument on the mobile electronic device at block 812, with the device responding to correct entry of the PIN by displaying a one-time password at block 816. As in other embodiments of the invention, the one-time password sometimes comprises a two-factor one-time password. This password is used by the customer to complete the log in to the participating web site at block 820, permitting the customer to enter into and complete a transaction at block 824.

In some embodiments, the security information that is used in the methods described in connection with either FIG. 7 or FIG. 8 may vary over time. That is, when a two-factor one-time password is generated, it may have a limited time of validity. In such embodiments, the customer 104 must generally provide the password within the limited time to validate the transaction. After the time period has expired, a new one-time password is generated that must be received in order to validate the transaction within a separate time period. Such a feature further enhances the overall security of the transaction methods.

Embodiments of the invention provide methods and systems for executing financial transactions between customers and merchants. In a first set of embodiments, an identifier of a financial account is received from the customer at a merchant system at block 902. A one-time password is also received from the customer at the merchant system at block 906, with the customer having been provided with the one-time password by a mobile electronic device or a contactless presentation instrument at block 904. A cryptogram is generated at block 908, with the cryptogram comprising the identifier of the financial account encrypted using the one-time password. An authorization request is formulated at the merchant system at block 910. The authorization request comprises the cryptogram and transaction information describing at least a portion of the financial transaction. The authorization request is transmitted from the merchant system to an authorization processor for authorization of the financial transaction at block 912.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of executing a financial transaction between a customer and a merchant, the method comprising:
   receiving, by a merchant system comprising a merchant point-of-sale device, an identifier of a financial account from a radio frequency identification chip, wherein the radio frequency identification chip is affixed to a customer's contactless presentation instrument;
   receiving, by the merchant system comprising the merchant point-of-sale device, a one-time password from the customer, wherein the customer is provided with the one-time password by a cellphone that loads and displays the one-time password to the customer, in order to conduct a financial transaction;
   generating, by the merchant system, a cryptogram comprising the identifier of the financial account encrypted using the one-time password;
   formulating, by the merchant system, an authorization request, the authorization request comprising the cryptogram and transaction information describing at least a portion of the financial transaction, wherein:
   the merchant system includes the merchant point-of-sale device; and
   within the authorization request, the identifier of the financial account is present as part of the cryptogram;
   transmitting, by the merchant system, the authorization request to an authorization processor for authorization of the financial transaction.

2. The method recited in claim 1 wherein the identifier comprises an account number of the financial account.

3. The method recited in claim 1 wherein the identifier comprises an identification number extracted from a presentation instrument, the method further comprising translating the identification number to an account number of the financial account.

4. The method recited in claim 1 wherein the one-time password comprises a two-factor one-time password.

5. The method recited in claim 1 wherein the one-time password is a second one-time password provided to the customer by the mobile electronic device or contactless presentation instrument after passage of an expiry time after a first one-time password is provided to the customer by the mobile electronic device or contactless presentation instrument.

6. The method recited in claim 1 wherein the merchant system comprises an Internet web server.

7. The method recited in claim 1 wherein the merchant system comprises a merchant point-of-sale device.

8. The method recited in claim 1 further comprising receiving a personal identification number from the customer at the merchant system, wherein the authorization request further comprises the personal identification number.

9. The method recited in claim 1 wherein the transaction information comprises data selected from the group consisting of a total cost for the financial transaction, a location, a point-of-sale-device identifier, a point-of-sale-device sequence number, a date, and a time.

10. The method recited in claim 1 wherein the financial account comprises an account selected from the group consisting of a debit account, a credit account, and a stored-value account.

11. A non-transitory computer-readable storage medium having a computer-readable program embodied therein for directing operation of a computer system, wherein the computer-readable program comprises instructions, which when executed cause the computer system to:
receive an identifier of a financial account from the customer at a point-of-sale device to conduct a debit or credit transaction, wherein the point-of-sale device is part of the merchant system, the identifier is stored on a contactless presentation instrument and the identifier is transmitted to the point-of-sale device by a radio frequency identification chip fixed to the contactless presentation instrument;
receive a one-time password from the customer at the point-of-sale device, wherein the customer is provided with the one-time password by a cellphone;
generate a cryptogram comprising the identifier of the financial account encrypted using the one-time password;
formulate an authorization request at the merchant system, the authorization request comprising the cryptogram and transaction information describing at least a portion of the financial transaction, wherein within the authorization request, the identifier of the financial account is present as part of the cryptogram; and
transmit the authorization request from the merchant system to an authorization processor for authorization of the financial transaction.

12. The system recited in claim 11 wherein the identifier comprises an account number of the financial account.

13. The system recited in claim 11 wherein;
the identifier comprises an identification number extracted from a presentation instrument; and
the computer-readable program further includes instructions for translating the identification number to an account number of the financial account.

14. The system recited in claim 11 wherein the one-time password comprises a two-factor one-time password.

15. The system recited in claim 11 wherein the one-time password is a second one-time password provided to the customer by the mobile electronic device or contactless presentation instrument after passage of an expiry time after a first one-time password is provided to the customer by the mobile electronic device or contactless presentation instrument.

16. The system recited in claim 11 wherein the merchant system comprises an Internet web server.

17. The system recited in claim 11 wherein the merchant system comprises a merchant point-of-sale device.

18. The system recited in claim 11 wherein:
the computer-readable program further includes instructions for receiving a personal identification number from the customer at the merchant system; and
the authorization request further comprises the personal identification number.

19. The system recited in claim 11 wherein the transaction information comprises data selected from the group consisting of a total cost for the financial transaction, a location, a point-of-sale-device identifier, a point-of-sale-device sequence number, a date, and a time.

20. The system recited in claim 11 wherein cryptographic keys used to generate the one-time password on the presentation instrument are generated on the presentation instrument and transmitted to an authentication processor or are generated on the authentication processor and transmitted to the presentation instrument.

21. The system recited in claim 11 wherein the debit presentation instrument does not divulge the one-time password until the merchant system has been validated using a mutual authentication scheme.

22. The system recited in claim 11 wherein the financial account comprises an account selected from the group consisting of a debit account, a credit account, and a stored-value account.

* * * * *